United States Patent
Bell et al.

(10) Patent No.: US 9,661,474 B2
(45) Date of Patent: May 23, 2017

(54) IDENTIFYING TOPIC EXPERTS AMONG PARTICIPANTS IN A CONFERENCE CALL

(71) Applicant: International Business Machines Corporation, Armonk, NY (US)

(72) Inventors: Denise A. Bell, Austin, TX (US); Lisa Seacat DeLuca, Baltimore, MD (US); David J. Levinson, Marietta, GA (US); Randa Salem, Rome (IT)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 14/338,462

(22) Filed: Jul. 23, 2014

(65) Prior Publication Data

US 2016/0028895 A1    Jan. 28, 2016

(51) Int. Cl.
*H04M 3/56* (2006.01)
*H04W 4/06* (2009.01)
*H04L 12/18* (2006.01)

(52) U.S. Cl.
CPC .............. *H04W 4/06* (2013.01); *H04L 12/18* (2013.01)

(58) Field of Classification Search
CPC ............................... H04M 3/563; H04W 4/06
USPC ........................................ 455/416, 417, 418
See application file for complete search history.

(56) References Cited

U.S. PATENT DOCUMENTS

| | | | |
|---|---|---|---|
| 8,295,462 B2 | 10/2012 | Miller et al. | |
| 8,400,489 B2 | 3/2013 | Le Goff et al. | |
| 8,441,702 B2 | 5/2013 | Do et al. | |
| 8,971,866 B2 | 3/2015 | Bhogal et al. | |
| 9,245,254 B2* | 1/2016 | Lord | H04L 12/1831 |
| 2006/0252442 A1* | 11/2006 | Nurmi | G06F 3/04817 455/518 |
| 2007/0005698 A1 | 1/2007 | Kumar et al. | |
| 2008/0040189 A1* | 2/2008 | Tong | G06Q 10/00 705/7.13 |
| 2008/0072158 A1 | 3/2008 | Samele et al. | |
| 2011/0141951 A1* | 6/2011 | Ramachandran | H04L 12/1818 370/263 |
| 2012/0166534 A1* | 6/2012 | Bentley et al. | 709/204 |
| 2012/0290950 A1* | 11/2012 | Rapaport | H04L 51/32 715/753 |
| 2013/0046571 A1* | 2/2013 | Tuchman | G06Q 10/06 705/7.14 |
| 2014/0104372 A1* | 4/2014 | Calman | H04N 7/155 348/14.08 |

OTHER PUBLICATIONS

Disclosed Anonymously, "System for Context Management of Authored Content in Crowd Sourced Environments," ip.com, an IP.com Prior Art Database Technical Disclosure, IP.com No. 000228697, Jun. 30, 2013, 4 pages.

* cited by examiner

*Primary Examiner* — Kashif Siddiqui
(74) *Attorney, Agent, or Firm* — Erik K. Johnson (57) ABSTRACT

A computing device determines one or more skills associated with one or more participants in a conference call. The computing device identifies one or more topics associated with a first time period of the conference call. The computing device designates a first set of participants as experts for at least one of the one or more topics associated with the first time period.

13 Claims, 6 Drawing Sheets

IDENTIFYING TOPIC EXPERTS AMONG PARTICIPANTS IN A CONFERENCE CALL

TECHNICAL FIELD

The present invention relates generally to conference calls, and more particularly to dynamically identifying topic experts among participants in a conference call.

BACKGROUND

During large audience conference calls among co-workers in a business context, there is often an agenda and several topics being discussed. It may be beneficial for the host of the conference call, and also the members of the conference call, to know the expertise of the other people on the conference call. This can allow any questions that arise during the conference call to be directed to the appropriate person. Knowing the expertise of the people on the conference call also makes it clear to the call participants, who the experts are for a given topic.

SUMMARY

In one aspect, the present invention provides a method for designating participants as having one or more topic skills A computing device determines one or more skills associated with one or more participants in a conference call. The computing device identifies one or more topics associated with a first time period of the conference call. The computing device designates a first set of participants as experts for at least one of the one or more topics associated with the first time period.

In another aspect, the present invention provides a computer program product for designating participants as having one or more topic skills, comprising program instructions to determine one or more skills associated with one or more participants in a conference call; program instructions to identify one or more topics associated with a first time period of the conference call; and program instructions to designate a first set of participants as experts for at least one of the one or more topics associated with the first time period.

In another aspect, the present invention provides a computer system for designating participants as having one or more topic skills, comprising program instructions to determine one or more skills associated with one or more participants in a conference call; program instructions to identify one or more topics associated with a first time period of the conference call; and program instructions to designate a first set of participants as experts for at least one of the one or more topics associated with the first time period.

In yet another aspect, the present invention provides a method for deploying a system for designating participants as having one or more topic skills, comprising: determining one or more skills associated with one or more participants in a conference call; identifying one or more topics associated with a first time period of the conference call; and designating a first set of participants as experts for at least one of the one or more topics associated with the first time period.

DETAILED DESCRIPTION

Embodiments of the present invention will now be described in detail with reference to the accompanying Figures.

Figure 1:
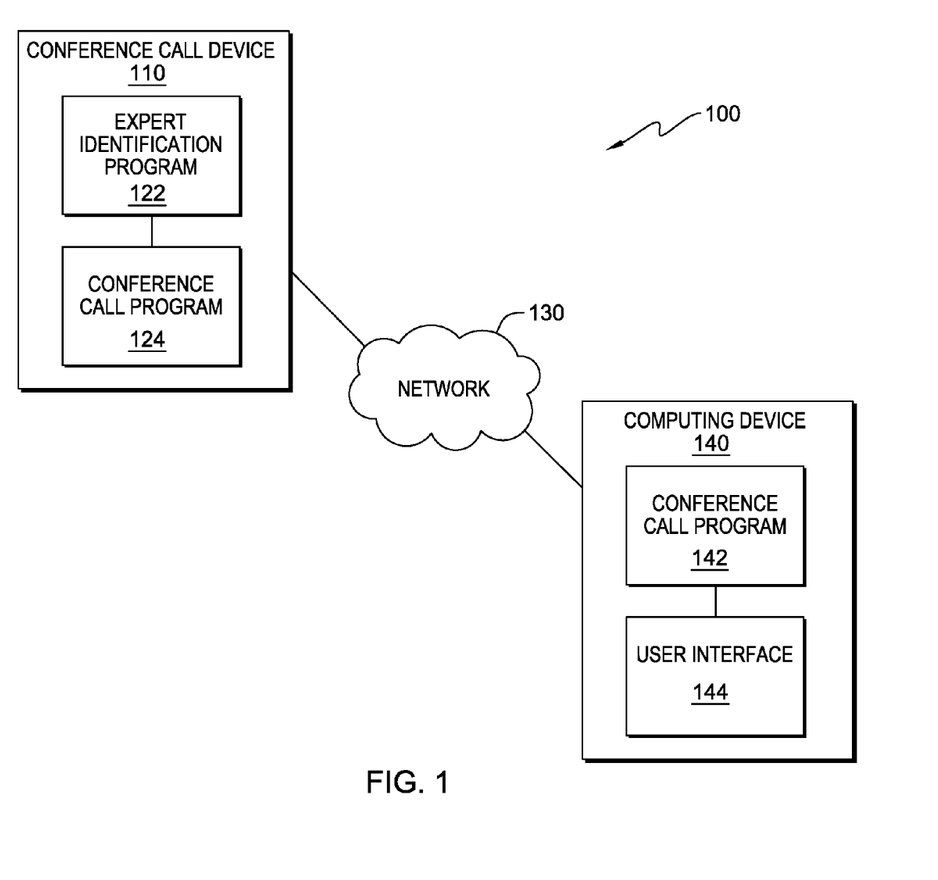
FIG. 1 illustrates an expert identification system, in accordance with an embodiment of the invention.

FIG. 1 illustrates expert identification system 100, in accordance with an embodiment of the invention. In an exemplary embodiment, expert identification system 100 includes conference call device 110 and computing device 140 all interconnected via network 130.

In the exemplary embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between conference call device 110 and computing device 140.

Conference call device 110 includes expert identification program 122 and conference call program 124. Conference call device 110 may be a desktop computer, a notebook, a laptop computer, a tablet computer, a handheld device, a smart-phone, a thin client, or any other electronic device or computing system capable of receiving and sending data to and from other computing devices, such as computing device 140, via network 130. Although not shown, optionally, conference call device 110 can comprise a cluster of web devices executing the same software to collectively process requests. Conference call device 110 is described in more detail with reference to FIG. 6.

Conference call program 124 is software capable of receiving and conducting a telephone call or conference call to one or multiple participants. In addition, in the exemplary embodiment, conference call program 124 is capable of displaying a list of conference call participants and information about each conference call participant to the user of conference call device 110 via a user interface. In other embodiments, conference call program 124 may include components to allow the user of conference call device 110 to video conference with other users. Conference call program 124 is described in more detail with reference to FIG. 6.

Expert identification program 122 is software capable of receiving information, such as a list of conference call participants or expertise information, via user input or from another computing device, such as computing device 140, via network 130. In the exemplary embodiment, expert identification program 122 determines experts among conference call participants for topics discussed during a conference call based on expertise information for each conference call participant. In the exemplary embodiment, expert identification program 122 is also capable of determining topics being discussed during a conference call. In the exemplary embodiment, expert identification program 122 is partially integrated with conference call program 124, while in other embodiments, expert identification program 122 may be fully integrated or separate from conference call program 124. The operations of expert identification program 122 are discussed in further detail with regards to FIG. 2 below.

Computing device 140 includes conference call program 142 and user interface 144. In the exemplary embodiment, computing device 140 may be a desktop computer, a notebook, a laptop computer, a tablet computer, a smartphone, a handheld device, a thin client, or any other electronic device or computing system capable of receiving and sending data to and from computing devices, such as conference call device 110, via network 130. Computing device 140 is described in more detail with reference to FIG. 6.

User interface 144 includes components used to receive input from a user and transmit the input to an application residing on computing device 140. In an exemplary embodiment, user interface 144 uses a combination of technologies and devices, such as device drivers, to provide a platform to enable users of computing device 140 to interact with conference call program 142. In the exemplary embodiment, user interface 144 receives input, such as textual input received from a physical input device, such as a keyboard, via a device driver that corresponds to the physical input device.

Conference call program 142 is a software application capable of receiving user preferences from a user of computing device 140 via user interface 144. In the exemplary embodiment, conference call program 142 is a sister program of conference call program 124, and is capable of communicating with other computing devices via a conference call program, such as conference call program 124. In the exemplary embodiment, conference call program 142 is capable of receiving and conducting a telephone call or conference call to one or multiple participants. In addition, conference call program 142 is capable of displaying a list of conference call participants and information about each conference call participant to the user of computing device 140 via user interface 144. In other embodiments, conference call program 142 may include components to allow the user of computing device 140 to video conference with other users. The operations and functions of conference call program 142 are described in further detail below with regard to FIG. 2.

Figure 2:
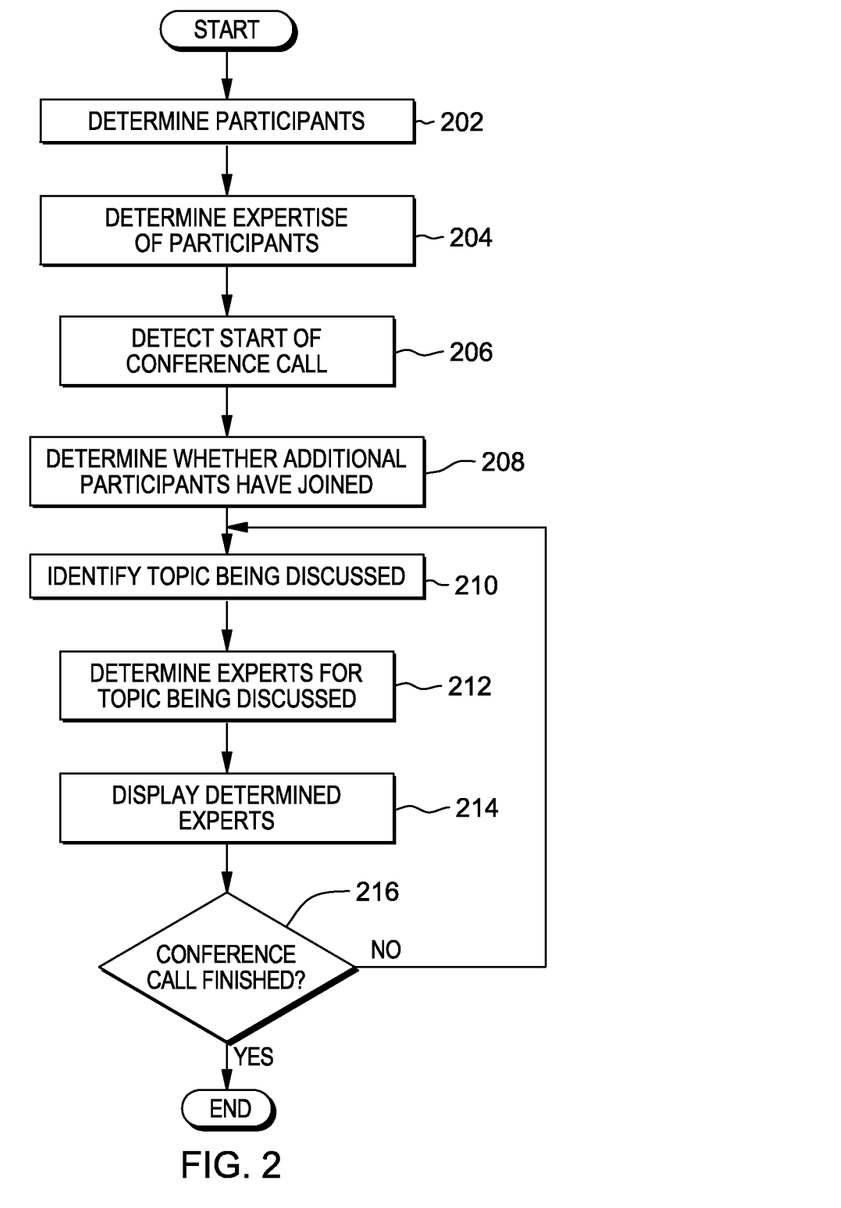
FIG. 2 is a flowchart illustrating the operations of the expert identification program of FIG. 1 in determining experts among conference call participants based on the topic being discussed, in accordance with an embodiment of the invention.

FIG. 2 is a flowchart illustrating the operations of expert identification program 122 in determining an expert based on the current topic of a conference call, in accordance with an exemplary embodiment of the invention. In the exemplary embodiment, expert identification program 122 determines the participants and an agenda for a conference call (step 202). In the exemplary embodiment, expert identification program 122 communicates with a mail server to determine a list of participants and an agenda for a conference call. In other embodiments, where the conference call invitation is created on conference call device 110, expert identification program 122 may communicate with an email program or another program to retrieve a list of participants and agenda associated with the conference call invitation.

Expert identification program 122 determines an expertise for each participant (step 204). In the exemplary embodiment, expert identification program 122 determines an expertise for each participant associated with the conference call invitation by communicating with another computing device, such as an employer server to obtain employee credentials, a social media website which contains employment and skills information, and other similar computing devices. For example, expert identification program 122 may scan an employee credential or social media website/file for certain keywords, such as "nanotechnology" or "Spanish Literature", in order to determine the subjects of expertise of a participant. In addition, expert identification program 122 may obtain expertise regarding participants via user input.

Expert identification program 122 then detects the start of the conference call (step 206). In the exemplary embodiment, expert identification program 122 is partially integrated with conference call program 124 and, therefore, is able to determine when a conference call has been initiated by conference call program 124. In other embodiments, expert identification program 122 may be fully integrated or a separate component from conference call program 124. In an embodiment where expert identification program 122 is a separate component from conference call program 124, expert identification program 122 communicates with conference call program 124 in order to determine if a conference call has been initiated.

Expert identification program 122 then determines whether any additional participants not listed on the participant list have joined the conference call (step 208). In the exemplary embodiment, a participant joins by using login credentials which are associated with the name or an identifier of the participant. As participants join the conference call, expert identification program 122 compares the name or identifier of the participant with the list of participants. If a participant who joined the conference call is not on the list of participants, expert identification program 122 determines the expertise of the participant in the same manner as described above.

Expert identification program 122 then identifies the topic being discussed in the conference call (step 210). In the exemplary embodiment, expert identification program 122 identifies the topic by referencing the agenda retrieved from the mail server, which may include the various topics to be discussed during the conference call. In other embodiments, expert identification program 122 may utilize voice recognition to determine the topic of the conference call by searching for certain keywords or the repetition of certain keywords with the speech of the host or presenter. For example, if the phrase "patent law" is repeated a certain number of times that is above a threshold amount, expert identification program 122 may determine that the topic of the current presentation is "patent law".

Expert identification program 122 then determines experts for the identified topic (step 212). In the exemplary embodiment, expert identification program 122 determines the experts for an identified topic by matching a participants determined skills or subjects of expertise with the topic being discussed. In the exemplary embodiment, expert identification program 122 determines if the relevant skill is substantially similar to the topic being discussed. In other embodiments, expert identification program 122 may utilize a skills dictionary which categorizes certain related skills into groups. Expert identification program 122 then cross-references the topic being discussed with the skills dictionary to determine the group of skills that fit the topic. Expert identification program 122 then determines which participants have a skill or subject of expertise that matches one of the skills included in the group of skills.

Expert identification program 122 then displays the determined experts for the current topic to the user of computing device 110 (step 214). In the exemplary embodiment, expert identification program 122 displays the determined experts utilizing a user interface associated with conference call program 124. In addition, expert identification program 122 may utilize conference call program 124 to transmit the determined experts for the topic being discussed to other computing devices, such as computing device 140, where the determined experts corresponding to the specific topic are displayed via user interface 144 in conjunction with conference call program 142. In other embodiments, expert identification program 122 may determine experts for all topics to be discussed during the conference call and utilize a user interface to display all topics which, when selected, denote the corresponding experts. The displaying of topics and corresponding experts will be discussed in further detail with regard to FIGS. 3, 4, and 5.

Expert identification program 122 then determines whether the conference call is complete (step 216). In the exemplary embodiment, if expert identification program 122 determines that the conference call is not complete and there is another topic left to discuss, expert identification program 122 returns to step 210 and identifies the topic being discussed (step 216, "NO" branch). If expert identification program 122 determines that the conference call is complete (step 216, "YES" branch), the process ends.

Figure 3:
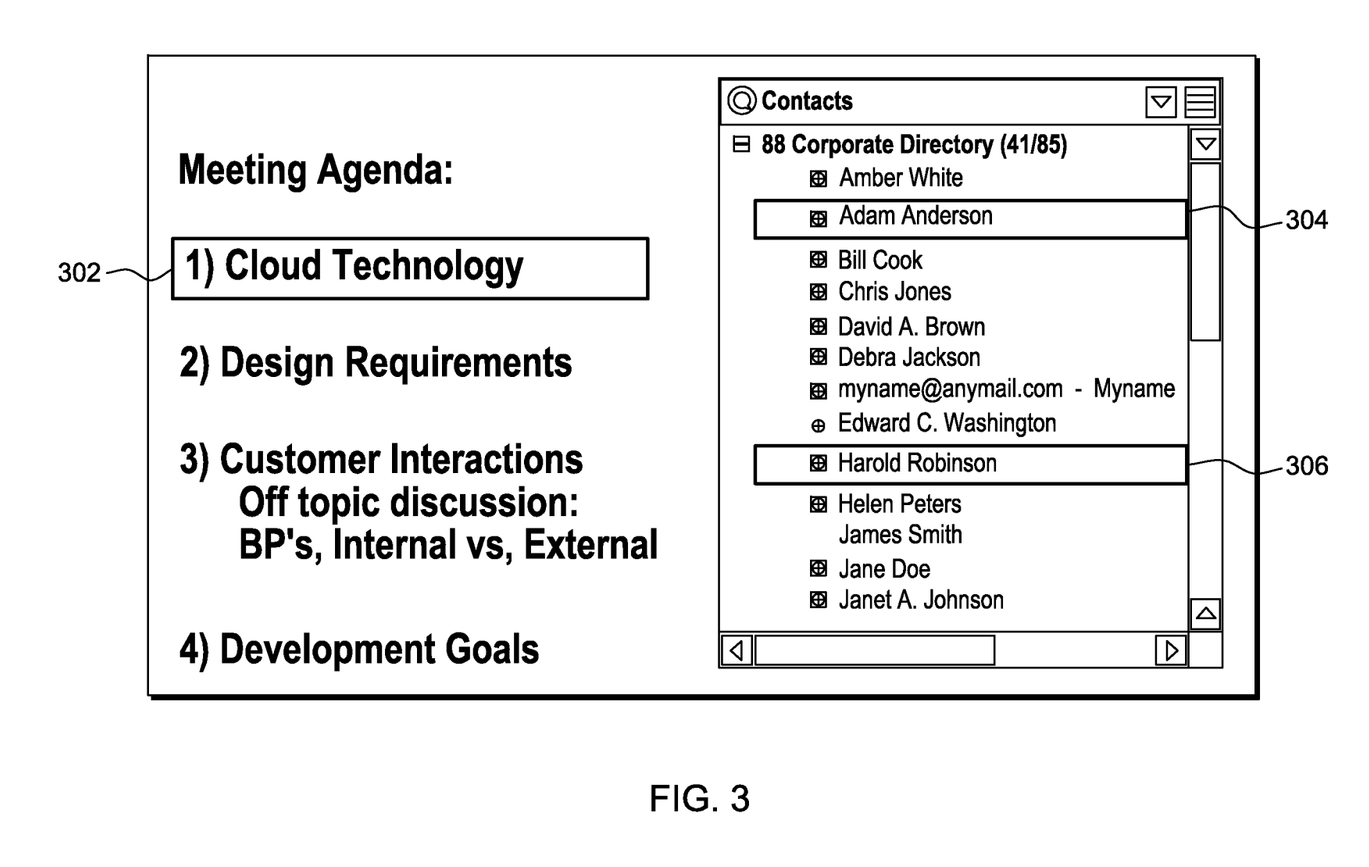
FIG. 3 depicts the current topic being a first topic and the corresponding experts associated with the first topic, in accordance with an embodiment of the invention.

FIG. 3 depicts the current topic being a first topic and the corresponding experts associated with the first topic, in accordance with an embodiment of the invention. In the depicted embodiment, topic 302, "Cloud Technology" is the current topic, determined by expert identification program 122 in the manner described above, with the corresponding experts, experts 304 and 306, highlighted and displayed to a user. In the exemplary embodiment, expert identification program 122 may denote an expert by highlighting as shown or via a different manner, such as an icon.

Figure 4:
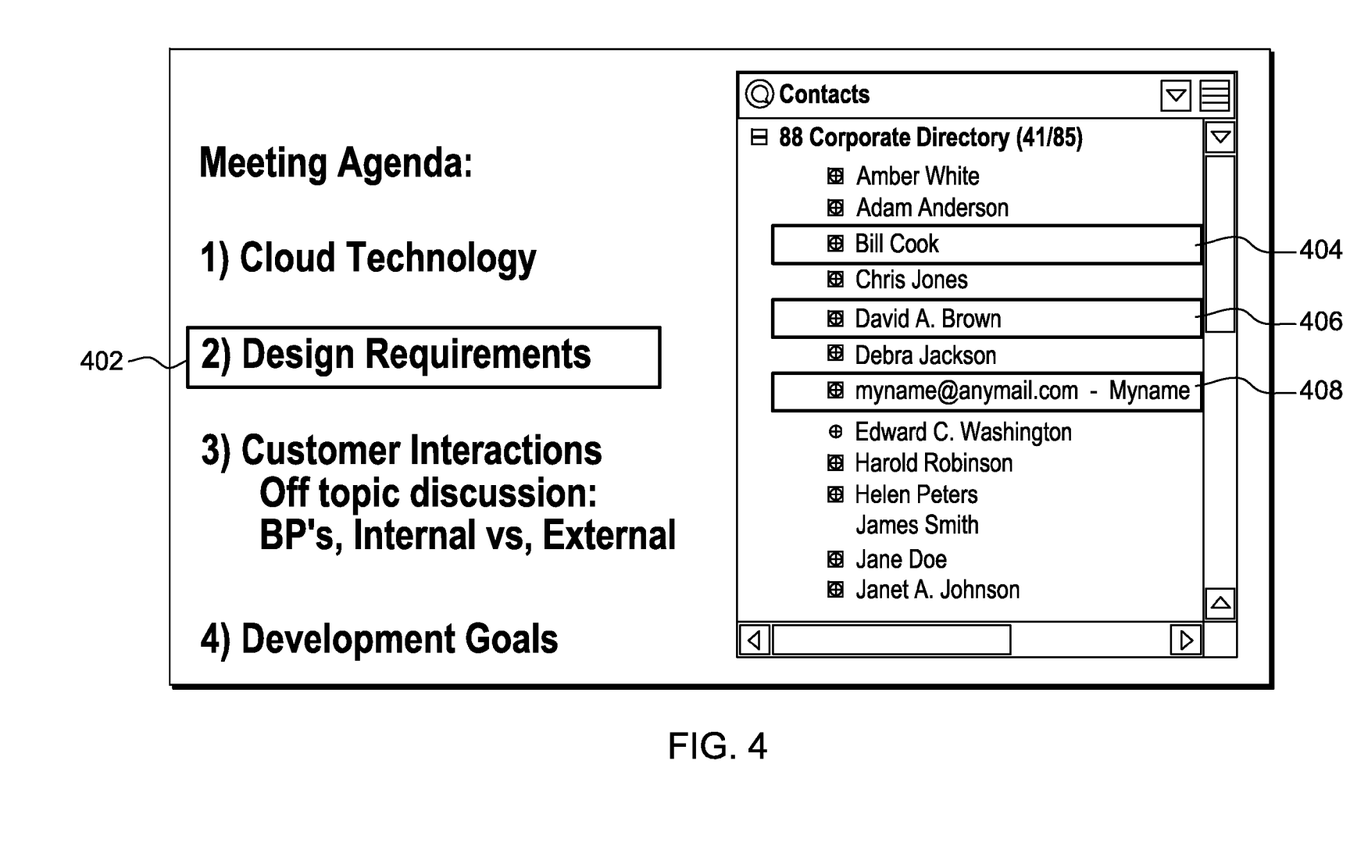
FIG. 4 depicts the current topic being a second topic and the corresponding experts associated with the second topic, in accordance with an embodiment of the invention.

FIG. 4 depicts the current topic being a second topic and the corresponding experts, in accordance with an embodiment of the invention. In the depicted embodiment, topic 402, "Design Requirements" is the current topic, determined by expert identification program 122 in the manner described above, with the corresponding experts: expert 404, expert 406, and expert 408, highlighted and displayed to a user. In the exemplary embodiment, as stated above, expert identification program 122 may denote an expert by highlighting as shown or via a different manner, such as an icon.

Figure 5:
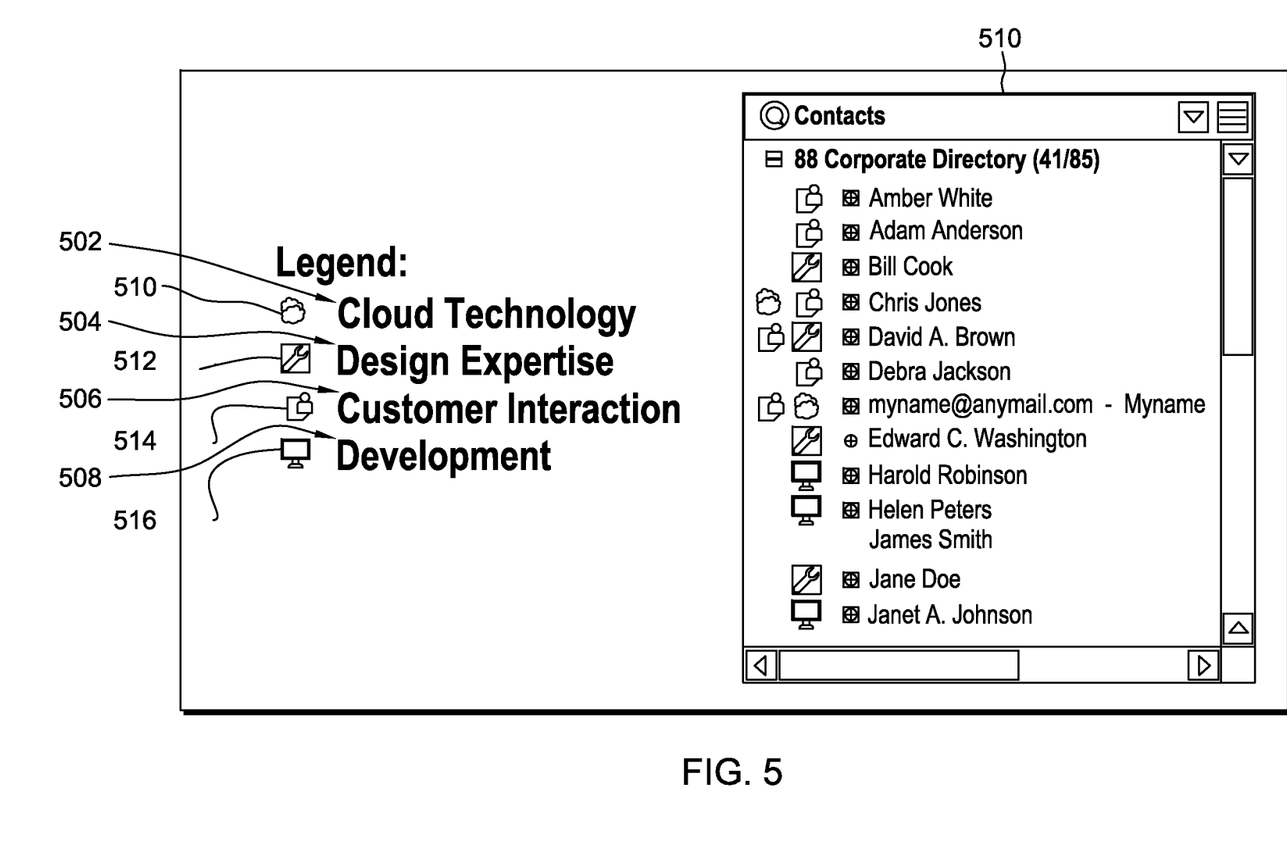
FIG. 5 depicts the current topic being multiple topics and the corresponding experts associated with the multiple topics, in accordance with an embodiment of the invention.

FIG. 5 depicts the selection of multiple topics and the corresponding experts, in accordance with an embodiment of the invention. In the depicted embodiment, topic 502, topic 504, topic 506, and topic 508 are the current topics, with icon 510, icon 512, icon 514, and icon 516 associated with each topic respectively, and the corresponding experts depicted in window 518. As depicted, each topic has a corresponding icon which is utilized to denote whether a participant is an expert in one or more topics. For example, topic 502 represents the topic "Cloud Technology, and is associated with a "cloud icon", icon 510. Participants depicted in window 518 who are experts in cloud technology have a "cloud icon" depicted next to the participant name.

In another embodiment, the invention provides a method that performs the process of the invention on a subscription, advertising, and/or fee basis. That is, a service provider, such as a Solution Integrator, could offer to provide functionality for designating one or more skills of conference call participants based on the topic. In this case, the service provider can create, maintain, support, etc., a computer infrastructure, such as expert identification system 100 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for designating one or more skills of conference call participants based on the topic. In this case, a computer infrastructure, such as expert identification system 100 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as expert identification system 100 (FIG. 1), from a computer readable medium; (2) adding one or more computing devices to the computer infrastructure; and (3) incorporating and/or modifying one or more existing systems of the computer infrastructure to enable the computer infrastructure to perform the processes of the invention.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 6:
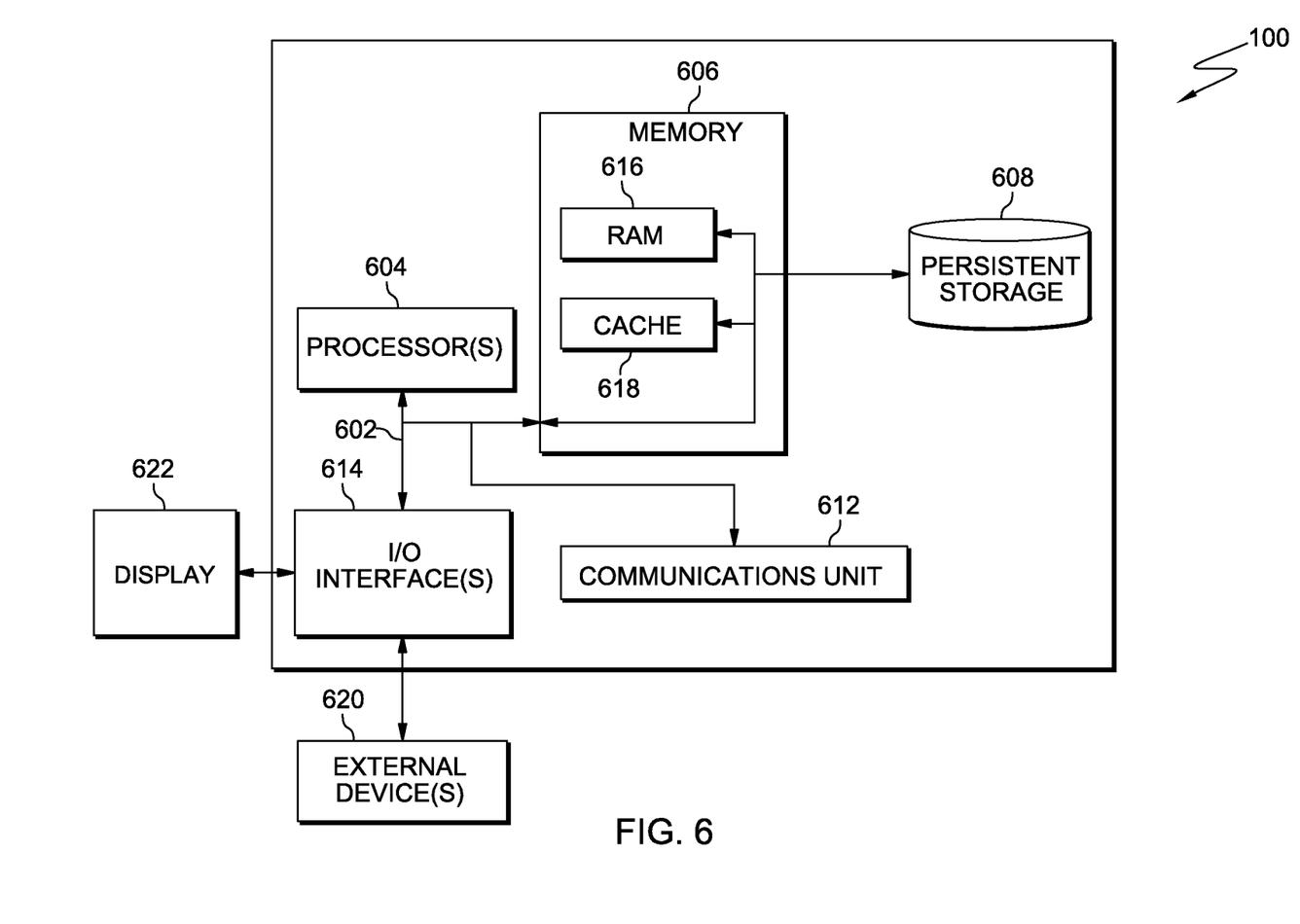
FIG. 6 is a block diagram depicting the hardware components of the expert identification program of FIG. 1, in accordance with an embodiment of the invention.

FIG. 6 depicts a block diagram of components of conference call device 110 and computing device 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Conference call device 110 and computing device 140 include communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

The programs expert identification program 122 and conference call program 124 in conference call device 110; and conference call program 142 and user interface 144 in computing device 140 are stored in persistent storage 608 for execution by one or more of the respective computer processors 604 via one or more memories of memory 606.

In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. The programs expert identification program 122 and conference call program 124 in conference call device 110, and conference call program 142 and user interface 144 in computing device 140, may be downloaded to persistent storage 608 through communications unit 612.

I/O interface(s) 614 allows for input and output of data with other devices that may be connected to conference call device 110 and computing device 140. For example, I/O interface 614 may provide a connection to external devices 620 such as, a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention, e.g., the programs expert identification program 122 and conference call program 124 in conference call device 110, and conference call program 142 and user interface 144 in computing device 140, can be stored on such portable computer-readable storage media and can be loaded onto persistent storage 608 via I/O interface(s) 614. I/O interface(s) 614 can also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for designating participants of a conference call as having one or more topic skills, comprising:
    a computing device determining one or more skills associated with one or more participants in a conference call by communicating with an employer server that provides credentials of the one or more participants;
    the computing device determining topics associated with a first time period of the conference call, wherein the step of determining topics is based on utilizing voice recognition of the conference call and identifying a first and a second topic associated with the first time period of the conference call by matching one or more phrases that are repeated above a threshold amount during the conference call to the first and the second topic;
    the computing device visually designating a first set of participants as experts for the first topic based on matching at least one skill of the first set of participants to the first topic by cross-referencing a skills dictionary, wherein the skills dictionary comprises a group of skills associated with the first topic; and
    the computing device visually designating a second set of participants as experts for the second topic based on matching at least one skill of the second set of participants to the second topic by cross-referencing the skills dictionary, wherein the skills dictionary comprises a group of skills associated with the second topic.

2. The method of claim 1, further comprising the computing device determining topics associated with a second time period of the conference call; and
    the computing device designating a third set of participants as experts for at least one of the topics associated with the second time period.

3. The method of claim 1, further comprising the computing device displaying the first set of participants designated as experts for at least one of the topics associated with the first time period.

4. The method of claim 1, wherein the computing device identifying topics associated with a first time period of the conference call further comprises:
    the computing device determining a first set of keywords by utilizing voice recognition; and
    the computing device identifying topics associated with the first time period of the conference call based on the determined first set of keywords.

5. A computer program product for designating participants of a conference call as having one or more topic skills, the computer program product comprising:
    one or more computer-readable storage devices and program instructions stored on at least one of the one or more tangible storage devices, the program instructions comprising:
    program instructions to determine one or more skills associated with one or more participants in a conference call by communicating with an employer server that provides credentials of the one or more participants;
    program instructions to determine topics associated with a first time period of the conference call, wherein the step of determining topics is based on utilizing voice recognition of the conference call and identifying a first and a second topic associated with the first time period of the conference call by matching one or more phrases that are repeated above a threshold amount during the conference call to the first and the second topic;
    program instructions to visually designate a first set of participants as experts for the first topic based on matching at least one skill of the first set of participants to the first topic by cross-referencing a skills dictionary, wherein the skills dictionary comprises a group of skills associated with the first topic; and
    program instructions to visually designate a second set of participants as experts for the second topic based on matching at least one skill of the second set of participants to the second topic by cross-referencing the skills dictionary, wherein the skills dictionary comprises a group of skills associated with the second topic.

6. The computer program product of claim 5, further comprising:
    program instructions to determine topics associated with a second time period of the conference call; and
    program instructions to designate a third set of participants as experts for at least one of the topics associated with the second time period.

7. The computer program product of claim 5, further comprising program instructions to display the first set of participants designated as experts for at least one of the topics associated with the first time period.

8. The computer program product of claim 5, wherein the program instructions to identify topics associated with a first time period of the conference call further comprises:
    program instructions to determine a first set of keywords by utilizing voice recognition; and
    program instructions to identify topics associated with the first time period of the conference call based on the determined first set of keywords.

9. A computer system for designating participants of a conference call as having one or more topic skills, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    program instructions to determine one or more skills associated with one or more participants in a conference call by communicating with an employer server that provides credentials of the one or more participants;
    program instructions to determine topics associated with a first time period of the conference call, wherein the step of determining topics is based on utilizing voice recognition of the conference call and identifying a first and a second topic associated with the first time period of the conference call by matching one or more phrases that are repeated above a threshold amount during the conference call to the first and the second topic;
    program instructions to visually designate a first set of participants as experts for the first topic based on matching at least one skill of the first set of participants to the first topic by cross-referencing a skills dictionary, wherein the skills dictionary comprises a group of skills associated with the first topic; and
    program instructions to visually designate a second set of participants as experts for the second topic based on matching at least one skill of the second set of participants to the second topic by cross-referencing the skills dictionary, wherein the skills dictionary comprises a group of skills associated with the second topic.

10. The computer system of claim 9, further comprising:
    program instructions to determine topics associated with a second time period of the conference call; and
    program instructions to designate a third set of participants as experts for at least one of the topics associated with the second time period.

11. The computer system of claim 9, further comprising program instructions to display the first set of participants designated as experts for at least one of the topics associated with the first time period.

12. The computer system of claim 9, wherein the program instructions to identify topics associated with a first time period of the conference call further comprises:
    program instructions to determine a first set of keywords by utilizing voice recognition; and
    program instructions to identify topics associated with the first time period of the conference call based on the determined first set of keywords.

13. The method of claim 1, wherein the method of claim 1 is performed by a service provider.

* * * * *